Nov. 16, 1926.  
W. J. ANDERSON  
ROCKING HORSE  
Filed Sept. 24, 1925  
1,607,423  
2 Sheets-Sheet 1
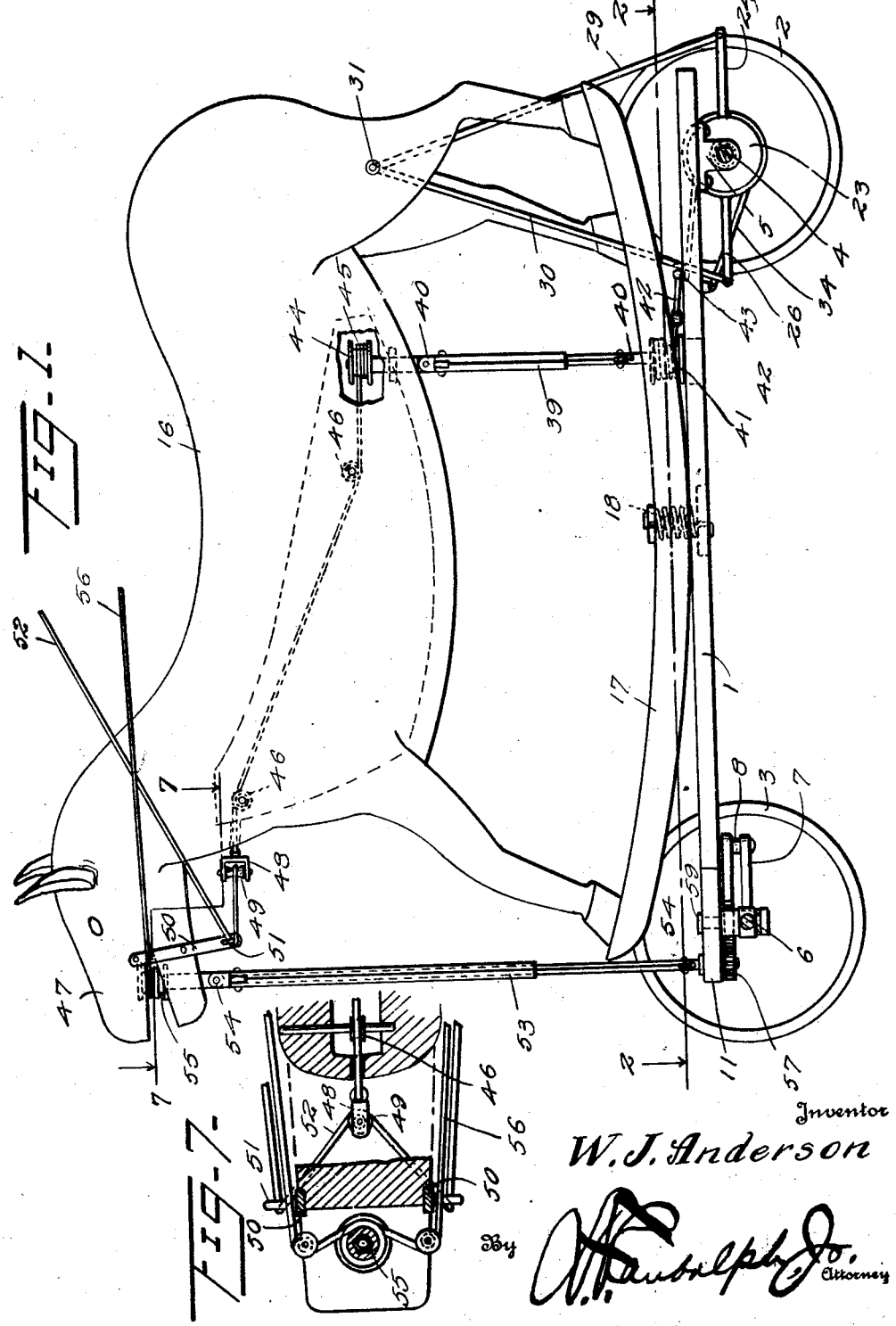

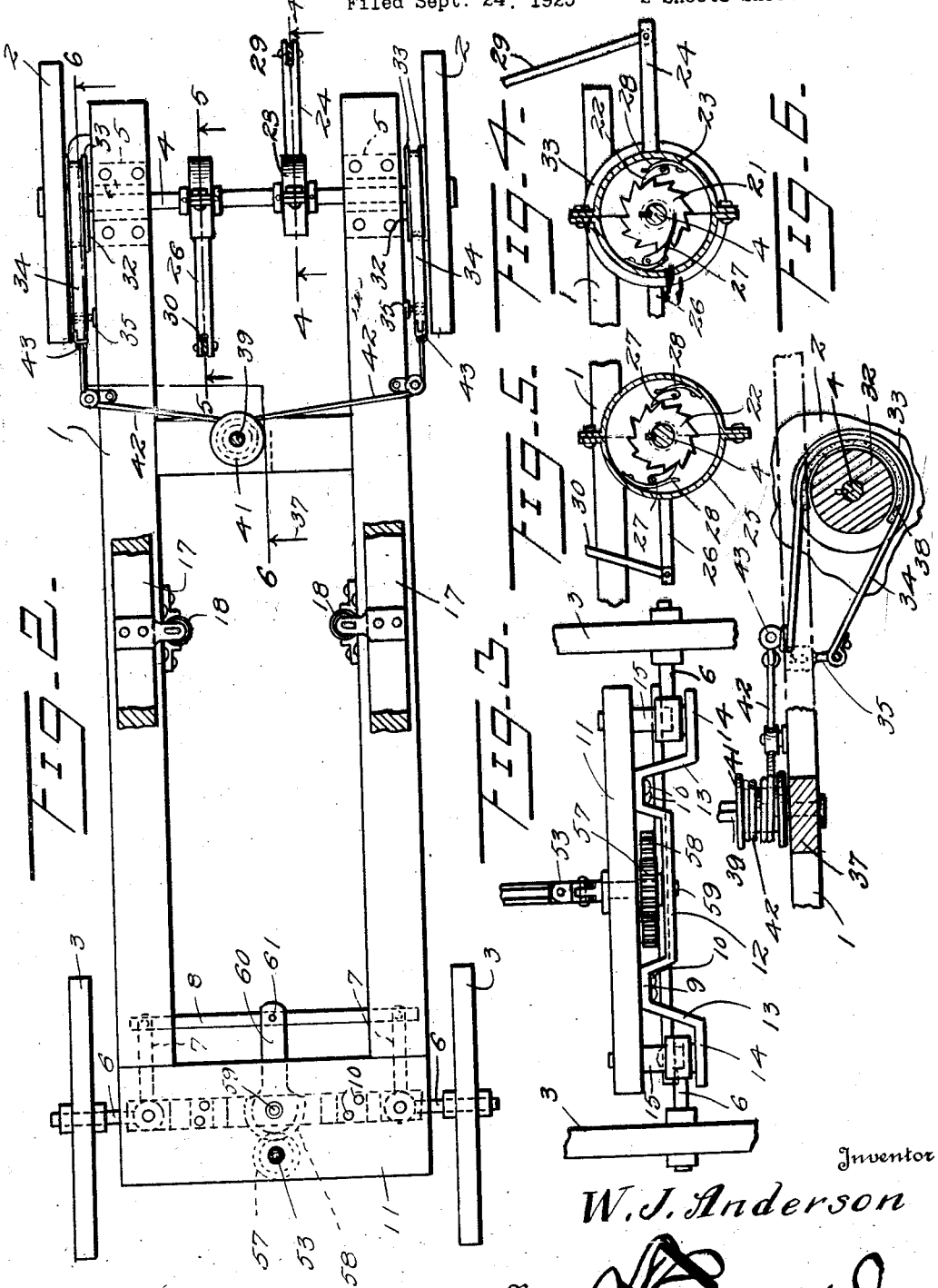

Patented Nov. 16, 1926.

1,607,423

UNITED STATES PATENT OFFICE.

WILLIAM J. ANDERSON, OF WINNIPEG, MANITOBA, CANADA.

ROCKING-HORSE.

Application filed September 24, 1925. Serial No. 58,407.

The invention relates to rocking horses for the amusement of children and has for its principal object the provision of means by which the rocking horse is mounted for oscillation on a preambulating platform with means operated by the oscillation of the rocking horse to transmit driving mechanism to driving wheels carrying platform.

A further object of the invention is the provision of a brake for controlling the movement of the perambulating platform, said brake being connected for operation by the rider by means of a flexible element simulating a curb driving rein, the connection between the brake and the curb driving rein being by means of a telescoping shaft having universal joints therein, the shaft being journaled on the platform and on the rocking horse, and drums being connected with the shaft, one of said drums being arranged to actuate the brake and connected with a brake band, while the other drum is arranged to be actuated by the curb rein heretofore referred to for rotating the shaft.

A further object of the invention is the provision of means for steering the rocking horse, the steering mechanism being controlled by driving reins that are arranged to actuate a steering shaft, said steering shaft being geared to the steering wheels, said shaft also being telescoping and provided with universal joints and journaled on the platform and on the rocking horse.

The construction and operation of the invention will be described in detail hereinafter as well as its advantages, and the construction will be found illustrated in the accompanying drawings in which—

Figure 1 is a side view of a rocking horse partly broken away and partly in section, Figure 2 is a horizontal sectional view on a plane indicated by the line 2—2 of Figure 1, Figure 3 is a front view, Figure 4 a vertical sectional view on a plane indicated by the line 4—4 of Figure 2, Figure 5 a similar view on a plane indicated by the line 5—5 of Figure 2, Figure 6 a similar view on a plane indicated by the line 6—6 of Figure 2, and Figure 7 a sectional view on a plane indicated by the line 7—7 of Figure 1.

In the drawings similar reference characters will be used to designate corresponding parts throughout the several views.

The improved rocking horse is mounted on a platform 1 that is supported by driving wheels 2 and steering wheels 3, the driving wheels 2 being secured for rotation with the driving axel 4 journaled in suitable journal boxes 5. The steering wheels 3 are mounted for rotation on steering knuckles 6, each of said steering knuckles 6 having a rearward extending arm 7 that is connected by means of a cross rod 8 pivotaly secured to each of the arms 7.

The front axel as shown most clearly in Figure 3 comprises a bar 9 secured as shown at 10 to a cross piece 11 forming the front of the platform 1. Bar 9 intermediate of the securing members 10 is provided with a depressed portion 12, while the ends of the bar have downwardly and outwardly inclined portions 13 and horizontal extremities 14. The knuckles 6 are journaled on vertical shafts 15 supported on the cross piece 11 and the horizontal extensions 14. The rocking horse is shown at 16 and mounted on rockers 17 that are supported on platform 1 for oscillation, 18 indicating a spring at the end to a bracket 19 on each rocker 17 and at the other end to a bracket secured to the platform 1. It will be understood that the springs 18 permit oscillation of the platform and at the same time prevent the rocking member from leaving the platform.

The driving mechanism for the platform comprises ratchet wheels 21 and 22 that are secured to the driving shaft 4, and said ratchet wheels are enclosed by a housing in each instance, the housing enclosing ratchet wheel 21 being designated 23 and having a rearwardly extending arm 24, while the housing enclosing the ratchet wheel 22 is designated 25 and has a forwardly extending arm 26. Each of the housings 23 and 25 is as shown in Figures 4 and 5 respectively in two segmental sections and is mounted for rotation on the driving axel 4 and in each housing are mounted two or more dogs 27 that are held in engagement with the teeth of the ratchet wheels 21 and 22 respectively by means of suitable springs 28. 29 and 30 indicate rods pivotally connecting the ends of arms 24 and 26 respectively, and a shaft 31 secured between the rear legs of the rocking horse.

It will be understood that when the animal is rocked on the platform, the rods 29 and 30 will oscillate the housings 23 and 25 by means of their connection with the arms 24 and 26, and dogs 27 will cause a forward movement of the platform through their engagement with the ratchet wheels 21 and 22.

A brake drum 32 is also secured to each of the wheels 2 and provided with flanges 33. 34 indicates a brake band for each brake drum secured to a bracket 35 on platform 1, 38 indicating the brake lining for the brake band 34. A telescoping shaft 39 is journaled at its lower end on a cross piece 37 and at its upper end in the figure of the horse 16, and is provided with universal joints 40 adjacent its upper and lower ends, it being understood that this construction permits oscillation of the rocking member and as the telescoping portions of the shaft 39 comprises mating sections that are other than circular, preferably hexagon in cross section, the shaft is capable of being rotated as a unit. A drum 41 is secured adjacent to the lower end of the shaft 39 and has secured thereto lengths of rope or other flexible elements 42, the free ends of the ropes being secured to the free ends of the brake bands 34 as shown at 43. 44 is another drum secured to the upper end of shaft 39 and has a rope or other flexible element 45 secured at one of its ends to the drum and trained around pulleys 46 journalled in the body of the figure 16 and emerging at the front of the body under the head 47 and has a yoke 48 secured thereto, a roller 29 being journaled between the arms of the yoke 48. Secured to the sides of the head 47 are downwardly extending arm 50 having eye loops 51 secured adjacent to their lower ends through which is trained a flexible member 52 that is also trained around the roller 49.

It will be apparent from this construction that when the flexible element 52 that corresponds to the curb reins of riding harness the rope 45 will be pulled forwardly through the instrumentality of the yoke 48 and roller 49 to rotate the drum 44 and impart rotation to the shaft 39 and wind the flexible element 42 on the drum 41 so that the brake band 34 will be tightened on the brake drum 32 and stop the forward movement of the platform 1.

The steering of the platform is accomplished by means of another telescoping shaft 53 that is also preferably hexagon in cross section and journaled at its lower end on the cross piece 11 and its upper end in the head 47 of the figure, the shaft being provided with universal joints 54 to permit oscillation of the animal without interfering with the operation of the shaft. The upper end of the shaft is provided with a drum 55 that is as shown located in the open mouth of the figure and has trained around it a flexible element 56 that simulates the driving rein of a riding bridle, said flexible element 56 being secured to the drum so that by pulling the flexible element at one side or the other the heads will cause the rotation of the shaft 53. 57 indicates a pinion secured to the lower end of the shaft 53 under the cross piece 11 that is in mesh with a segmental gear 58 journaled on a pin 59 secured in cross piece 11 and the downward extension 12 of the axle bar 9. 60 indicates an arm extending rearwardly from segmental gear 58 and pivotally engaging the cross rod 8 as shown in 61.

It will be apparent that when the shaft 53 is rotated in the manner heretofore described by actuation of the flexible element 56, the cross rod 8 will be moved laterally through the gearing 57 and 58 and the arm 60 and the knuckles 6 will be moved to direct the wheels 3 to steer the platform.

What is claimed is:—

1. In a propelling mechanism for a rocking device, a platform, a driving axle journaled on the platform, a rocking member disposed on the platform, ratchet wheels secured to said axle, a housing enclosing each ratchet wheel and rotatably mounted on the axle, dogs pivoted in said housings and engaging said ratchet wheels, and means connecting the rocking member and said housings to oscillate them.

2. In a propelling mechanism for a rocking device, a platform, a driving axle journaled on the platform, a rocking member disposed on the platform, ratchet wheels secured to said axle, a housing enclosing each ratchet wheel and rotatably mounted on the axle, dogs pivoted in said housings and engaging said ratchet wheels, an arm extending from each housing, and a rod pivotally engaging each arm and rocking member.

3. In a propelling mechanism for a rocking device, a wheel supported platform, a rocking member mounted on said platform, means actuated by the rocking member to propel the platform, and a steering mechanism comprising knuckle joints journaling the steering wheels, a rod connecting said knuckle joints, an arm pivotally secured to the platform and engaging said rod, a telescoping steering column operatively connected to said arm and engaging said rocking device, and means to actuate said steering column.

4. In a propelling mechanism for a rocking device, a platform, wheels supporting said platform, a driving axle journaled on the platform, wheels secured for rotation with said axle, a rocking member including a figure of a quadruped mounted on said platform, means connecting said rocking member and the driving axle to rotate the axles through oscillation of the rocking member, a telescoping steering shaft journaled on the platform and in the head of the figure, means connected to said shaft to steer the platform, a drum on said shaft and positioned in the mouth of the figure, and driving lines secured to said drum and adapted to be actuated by a rider of the figure to actuate the drum and shaft.

In testimony whereof I affix my signature.

WILLIAM J. ANDERSON.